(12) United States Patent
Goldberg et al.

(10) Patent No.: US 8,576,405 B2
(45) Date of Patent: Nov. 5, 2013

(54) HETERODYNE POLARIMETER WITH A BACKGROUND SUBTRACTION SYSTEM

(75) Inventors: Doron Goldberg, Metula (IL); Zeev Weissman, Ness Ziona (IL); Yaniv Yacov, Haifa (IL)

(73) Assignee: Mellitor Ltd., Katzrin (IL)

( * ) Notice: Subject to any disclaimer, the term of this patent is extended or adjusted under 35 U.S.C. 154(b) by 401 days.

(21) Appl. No.: 13/120,211

(22) PCT Filed: Sep. 23, 2009

(86) PCT No.: PCT/IL2009/000920
§ 371 (c)(1),
(2), (4) Date: Mar. 22, 2011

(87) PCT Pub. No.: WO2010/035260
PCT Pub. Date: Apr. 1, 2010

(65) Prior Publication Data
US 2011/0176132 A1    Jul. 21, 2011

Related U.S. Application Data

(60) Provisional application No. 61/099,984, filed on Sep. 25, 2008.

(51) Int. Cl.
*G01N 21/21* (2006.01)
(52) U.S. Cl.
USPC .......................................... 356/491; 356/366
(58) Field of Classification Search
None
See application file for complete search history.

(56) References Cited

U.S. PATENT DOCUMENTS

| | | | |
|---|---|---|---|
| 4,671,657 A | 6/1987 | Calvani et al. | |
| 4,832,492 A | 5/1989 | Calvani et al. | |
| 5,896,198 A | 4/1999 | Chou et al. | |
| 6,018,391 A * | 1/2000 | Yoshida | 356/484 |
| 6,188,477 B1 | 2/2001 | Pu et al. | |
| 6,327,037 B1 | 12/2001 | Chou et al. | |
| 2010/0259759 A1 | 10/2010 | Goldberg et al. | |

FOREIGN PATENT DOCUMENTS

| | | |
|---|---|---|
| WO | 2008/018079 A2 | 2/2008 |
| WO | 2009069127 A1 | 6/2009 |

OTHER PUBLICATIONS

International Preliminary Report on Patentability published Mar. 29, 2011 for PCT/IL2009/000920 filed Sep. 23, 2009.
H. J. King et al; "Optical heterodyne polarimeter for measuring the chiral parameter and the circular refraction indices of optical activity" Optics Letters vol. 18, No. 22 (1993).
S.F. Jacobs;"Optical heterodyne (coherent) detection" American Journal of Physics vol. 56, Issue 3, pp. 235 (1988).
International Search Report mailed Jan. 20, 2010 for PCT/IL2009/000920 filed Sep. 23, 2009.
Written Opinion of the International Searching Authority mailed Jan. 20, 2010 for PCT/IL2009/000920 filed Sep. 23, 2009.

* cited by examiner

*Primary Examiner* — Gregory J Toatley
*Assistant Examiner* — Maurice Smith
(74) *Attorney, Agent, or Firm* — Fleit Gibbons Gutman Bongini & Bianco PL; Martin Fleit; Paul D. Bianco

(57) ABSTRACT

A polarimeter based on coherent detection and a method for measuring the optical rotation of a polarized light beam by an optically active substance, while enabling the subtraction of background signals, are provided.

21 Claims, 4 Drawing Sheets

HETERODYNE POLARIMETER WITH A BACKGROUND SUBTRACTION SYSTEM

FIELD OF THE INVENTION

The present invention relates to a method and a device capable of measuring the rotation of linearly polarized light, with improved resolution and accuracy, by employing an efficient background subtraction system. The method and device are suitable for applications such as the monitoring of the concentration of optically active substances in a solution. The detection device is a heterodyne polarimeter using coherent detection to measure optical rotation, with high sensitivity and resolution, while enabling the subtraction of all background signals, without the need to measure reference samples.

BACKGROUND OF THE INVENTION

The accurate measurement of the concentration of chiral molecules in a solution by a polarimeter is required in many applications, such as the synthesis of organic molecules where the outcome of a reaction is a racemic mixture of both enantiomers. Enantiomers have identical physicochemical characteristics except for the rotation of linearly polarized light. Enantiomers also interact differently with biological stereospecific molecules. This difference can become crucial in the pharmaceutical industry, where in many cases only one enantiomer of a drug has the desired therapeutic activity while the other can be highly toxic. For example, one enantiomer of the notorious medication Thalidomide had the intended sedative effect, while the other was extremely teratogenic and caused severe birth defects. Therefore, the accurate and sensitive determination of the ratio of the two enantiomers is of utmost importance for drugs manufacturers. A more sensitive and accurate polarimeter may mean lower concentrations of precious reagents, faster development processes, and purer, safer drugs.

Polarimeters based on coherent (heterodyne) detection (Jacobs, S. F., (1988), Optical heterodyne (coherent) detection, *Am. J. Phys.*, 56 (3): 235-245, and King, H. J., Chou, C., and Lu, S. T., Optical heterodyne polarimeter for measuring the chiral parameter and the circular refraction indices of optical activity, *Opt. Lett.*, 1993, 18: 1970-1972), have the advantage of being sensitive and accurate without any moving mechanical parts, which are required by ordinary polarimeters in order to rotate polarizers or move quartz plates. They also do not rely on bulky optical components, like Faraday rotators, which can be found in modern advanced polarimeters.

The optical heterodyne is created in such polarimeters when two coherent laser beams, having slightly different optical frequencies, interfere on the face of a photodetector. The photodetector acts as a mixer, generating a current containing a signal at the difference frequency ("beat"). The amplitude of the beat signal is proportional to the multiplication of the amplitudes of the electric fields of the interfering beams and, therefore, can be used to amplify weak optical signals.

When the polarization of the two interfering coherent beams is perfectly orthogonal, no beat signal can be generated. However, if the electric field vector of at least one of the beams is rotated by an optically active substance, a beat signal can be generated at the photodetector, which is directly proportional to the sine of the rotation angle. This signal can be larger by several orders of magnitude than signals generated by ordinary polarimeters, which are proportional to the square of the sine of the rotation angle.

However, like any other measuring device, the accuracy and resolution of the heterodyne polarimeter rely on the ability to discern the contribution of optical activity from variable sources of polarization noise (i.e. anything other than optical activity allowing more light to reach the detector through the analyzer), which add to the detected coherent signal. Such sources can be, for example, the finite extinction ratio of the polarizers and depolarization of the linearly polarized laser beam by scattering. Polarization noise can also be generated by residual longitudinal electric fields (created when the wavefront of the laser beams is deformed, for example, by thermal gradients) and birefringence in the optical elements along the optical path. This birefringence can be dependent on the temperature of the elements and vary when the temperature changes. If beam splitters are used in a heterodyne polarimeter, the electric field vector of the linearly polarized light beams can rotate simply because the splitting ratio of the two orthogonal components changes. This rotation can cause an increase in the background coherent signal. The splitting ratio itself can vary when the angle of incidence of the polarized laser beams is changed by thermal and mechanical motions in the mechanical frame of the polarimeter.

The contribution of the various sources of background polarization noise to the total heterodyne signal can be assessed, in principle, by measuring a reference (blank) sample. Nevertheless, this is not always possible, especially when the background signal rapidly changes or when a parallel, but different, optical setup is needed to measure the reference sample.

U.S. Pat. No. 4,832,492 discloses a heterodyne polarimeter based on a Michelson interferometer, which employs a single laser source. No mention is made in this patent to the problem of polarization noise and background subtraction. In fact, if this polarimeter is used to measure the concentration of a chiral molecule, any such noise originating in the two arms of the interferometer can be falsely interpreted as optical activity.

U.S. Pat. Nos. 5,896,198 and 6,327,037 disclose a heterodyne polarimeter employing a two-frequency laser source and a common path interferometer. However, this polarimeter cannot distinguish between a heterodyne signal resulting from increased optical activity in the sample or a one resulting from increased depolarization by scattering along the optical path. It also does not take into account the background heterodyne signal that can be introduced simply by the practical imperfection of Zeeman lasers. Any attempt in such a polarimeter to sample the laser beam by inserting a beam splitter into the optical train is likely to introduce polarization noise, which cannot be canceled.

U.S. Pat. No. 6,188,477 discloses a polarimeter based on a self-homodyne scheme. Here too, no distinction can be made between the optical activity dependent signal and signals generated by background polarization noise, for example, due to increased depolarization caused by scattering in the cell holding the sample. This polarimeter also is likely to be sensitive to mechanical phase noise in the optical setup responsible for the phase modulation. Canceling this phase noise will necessitate the sampling of the beam before the measurement cell, introducing yet another source of polarization noise.

Recently, the inventors disclosed a polarimeter for quantitative measurement of the concentration of optically active substances in a solution by either incorporating a Mach-Zehnder interferometer into a polarimeter and addressing the problem of background subtraction (WO 2008/018079), or by providing a polarimeter based on a modified Fizeau interferometer (WO 2009/069127).

SUMMARY OF THE INVENTION

It is an object of the present invention to improve the accuracy of a heterodyne polarimeter by employing an efficient background subtraction scheme.

According to a first aspect, the present invention relates to a method for measuring the optical rotation of a polarized light beam by an optically active substance, using a polarimeter with an efficient background subtraction system, comprising the steps of:

a) generating by a laser a first coherent light beam of a first frequency;

b) linearly polarizing said first light beam by passing it through a first polarizer, so that its electric field vector becomes parallel to the main plane of the polarimeter, defined by the polarizer's transmission axis and the beam's direction;

c) directing said first linearly polarized light beam through an interferometer, whereby:

(i) said first linearly polarized light beam of (a) is split, so that one part of it is reflected at an angle with respect to the original direction, creating a second linearly polarized beam, and the other part is transmitted in the original direction, creating a third linearly polarized beam;

(ii) the electric field vector of said reflected second linearly polarized beam is rotated by mirroring it around an axis set at 45 degrees with respect to the polarimeter's main plane, so that its polarization becomes orthogonal to the polarization of said first linearly polarized beam;

(iii) the optical frequency of said second beam is shifted by an amount ranging, typically, from several hundred hertz to several kilohertz, so that said reflected beam now has a second frequency different from said first frequency;

(iv) said second beam is reflected so that it returns exactly along its original path, which is collinear with the path of said third beam;

(v) said transmitted third linearly polarized light beam is passed through a sample comprising an optically active substance and its electric field vector is rotated by said optically active substance;

(vi) the relative phase of the orthogonal components of said third linearly polarized light beam is changed either from 0 to $\pi/2$ radians or from $\pi/2$ to $\pi$ radians, said change can be continuous following a sine waveform at a low frequency of several hertz; when the relative retardance angle is either 0 or $\pi$ radians, said third linearly polarized light beam becomes a reference beam, and when the relative retardance angle is $\pi/2$ radians, said third linearly polarized light beam becomes a measurement beam, the transition between said reference and measurement beams can be continuous, following a sine waveform at a low frequency of several hertz;

(vii) said reference beam is reflected, so that it returns along the path of said third light beam and the relative phase of its orthogonal components is, again, changed by the same angle of either 0 or $\pi$ radians, so that when it passes through the sample in the reverse direction, its electric field vector is rotated by said optically active substance in the sample in such a way that said linearly polarized reference beam accumulates no net optical rotation, with respect to said first linearly polarized light beam;

(viii) said measurement beam is also reflected and returns along the path of said third light beam and the relative phase of its orthogonal components is, again, changed by the same angle of $\pi/2$ radians, so that when it passes through the sample, its electric field vector is rotated by said optically active substance in the sample, and its optical rotation, imparted by said optically active substance, is doubled with respect to said third linearly polarized light beam;

(ix) said linearly polarized reference and measurement light beams, transmitted by said sample, are combined and interfere, in their turn, with said second, frequency-shifted, linearly polarized light beam to generate a fourth light beam;

d) passing said fourth linearly polarized light beam through a second polarizer whose transmission axis is perpendicular to the transmission axis of said first polarizer;

e) directing the transmitted component of said fourth light beam to a photodetector to generate a heterodyne signal; when said fourth light beam is the result of interfering said reference beam with said second beam, said heterodyne signal is a reference signal proportional only to the amount of polarization noise in the polarimeter; when said fourth light beam is the result of interfering said measurement beam with said second beam, said heterodyne signal is a measurement signal proportional also to the optical rotation imparted by said optically active substance, the transition between said reference and measurement signals can be continuous following, for example, a sine waveform whose minima are said reference signal and maxima are said measurement signal; and f) storing and processing said reference and measurement signals and generating comparison signals using said reference signals to subtract any background signals from said measurement signals, said comparison signals indicating the polarization rotation angle imparted to said linearly polarized measurement light beam by said optically active substance, wherein said polarization rotation angle can be used to infer the concentration of said optically active substance.

In another aspect, the present invention relates to a polarimeter, with an efficient system for background subtraction, for measuring the optical rotation of a linearly polarized light beam by an optically active substance, comprising:

a) a laser source for generating a first coherent light beam of a first frequency;

b) a first polarizer for linearly polarizing said first light beam whose transmission axis, together with the beam's direction, defines the main plane of the polarimeter;

c) an interferometer comprising:

(i) a non-polarizing beam splitter for splitting said first linearly polarized light beam, so that one part of it is reflected at an angle with respect to the original direction, creating a second linearly polarized beam, and the other part is transmitted in the original direction, creating a third linearly polarized beam;

(ii) a quarter $\lambda$ wave-plate placed on the path of said reflected second linearly polarized beam, whose fast axis is set at 45 degrees with respect to the polarimeter's main plane, for rotating the electric field vector of said second linearly polarized beam, so that it becomes orthogonal to its original direction after it passes said quarter $\lambda$ wave-plate in the reverse direction;

(iii) a frequency shifter, for shifting the optical frequency of said second beam, with said rotated electric field vector, so that said second linearly polarized beam will have a second frequency different from said first frequency;

(iv) a first mirror for reflecting said second linearly polarized beam exactly in the reverse direction, whereby said reflected second beam returns along its original path;

(v) means for holding a sample comprising an optically active substance on the path of said third linearly polarized light beam;

(vi) a variable phase retarder placed after said means for holding a sample, which can change the relative phase of the two orthogonal components of a polarized light beam whose fast axis is set parallel to the main plane of the polarimeter; the relative retardance angle induced by said variable phase retarder can be continuously changed, either from 0 to $\pi/2$ radians or from $\pi/2$ to $\pi$ radians, following, for example, a sine waveform at a low frequency of several hertz; when the relative retardance angle is either 0 or $\pi$ radians, said third linearly polarized light beam becomes a reference beam, and when the relative retardance angle is $\pi/2$ radians, said third linearly polarized light beam becomes a measurement beam, the transition between said reference and measurement beams can be continuous, following, for example, a sine waveform at a low frequency of several hertz;

(vii) a second mirror, placed after said variable phase retarder, for reflecting said linearly polarized reference and measurement beams exactly in the reverse direction, whereby said reflected reference and measurement beams return through said variable phase retarder and said means for holding an optically active substance, and their electric field vector is rotated by said optically active substance, so that said linearly polarized reference beam accumulates no net optical rotation, with respect to said first linearly polarized light beam, and the optical rotation of said measurement beam, imparted by said optically active substance, is doubled with respect to said third linearly polarized light beam;

(viii) a beam combiner for combining and interfering said returning linearly polarized reference and measurement beams, in their turn, with said second, frequency-shifted, light beam to generate a fourth light beam;

d) a second polarizer whose transmission axis is orthogonal to the transmission axis of said first polarizer;

e) a photodetector for receiving the transmitted component of said fourth linearly polarized light beam and generating a heterodyne signal; when said fourth light beam is the result of interfering said reference beam with said second beam, said heterodyne signal is a reference signal proportional only to the amount of polarization noise in the polarimeter; when said fourth light beam is the result of interfering said measurement beam with said second beam, said heterodyne signal is a measurement signal proportional also to the optical rotation imparted by said optically active substance, the transition between said reference and measurement signals can be continuous following a sine waveform whose minima are said reference signal and maxima are said measurement signal; and f) electronic means for storing and processing said reference and measurement signals and for generating comparison signals using said reference signals to subtract any background signals from said measurement signals, said comparison signals indicating the polarization rotation angle imparted to said linearly polarized measurement beam, wherein said polarization rotation angle can be used to infer the concentration of said optically active substance.

In preferred embodiments of the present invention, the method and the polarimeter are useful for quantitatively measuring the concentration of an optically active substance in a solution held in a measurement cell with transparent walls, but also the measuring of the optical activity of solid substances is encompassed by the present invention.

Without any optical activity in the measurement cell, and assuming that only ideal optical components are used, both the reference and measurement beams will be perfectly orthogonal to the frequency-shifted beam and no heterodyne signal should be detected. An optically active substance in the measurement cell, on the other hand, will rotate the electric field vector of only the measurement beam, because its electric field vector is mirrored around the fast axis of the variable phase retarder. In this case, a heterodyne signal at the shifted frequency will be detected. Since the reference beam's electric field vector is not similarly mirrored, it gains no net optical rotation and has, ideally, no component which can reach the detector and generate a heterodyne signal.

Practically, a background heterodyne signal can be generated at the detector even without an optically active substance in the measurement cell. Possible sources for this background signals could be, as discussed above, depolarization by scattering, temperature dependent birefringence in transmissive optical elements, residual longitudinal electric fields, changes in the splitting ratio of the two orthogonal components of the polarized laser beams by non-polarizing beam splitters, etc. Since no heterodyne signal can be generated by the reference beam due to optical activity, it can be used to assess the contribution of the various background signals to the total amplitude of the heterodyne signal.

The variable phase retarder can be a liquid crystal device or an electro-optic crystal, which can induce a relative retardance angle of, at least, $\pi$ radians.

Several different means can be used to modulate the second linearly polarized beam in order to generate the coherently detected signal. For example, the mirror reflecting the second beam in the reverse direction can be mounted on a translation stage actuated by a piezoelectric crystal (such as PZT), with a long traveling range, operated at a low frequency of several hertz (or less) and a sawtooth or triangle waveform. The piezo-actuated translation stage can move the mirror several hundred micrometers in each cycle shifting the optical frequency of the linearly polarized second light beam by the "Doppler effect". This frequency shift is typically in the range of several hundred hertz to several kilohertz. Alternatively, a thin PZT disk, coated by a reflecting layer, can be used to modulate the phase of the second linearly polarized beam at a frequency ranging from several hundred hertz to several megahertz, with a sine waveform and amplitude smaller than $\pi/2$. Such a phase modulation will create a coherently detected signal of the homodyne type whose amplitude becomes maximal when the phase difference between the second beam and the measurement and reference beams is around $\pi/2$ radians. Electro-optic and acousto-optic modulators can also be used for shifting the frequency or modulating the phase of the second linearly polarized beam.

It should be understood by those skilled in the art that the frequency or phase of the third linearly polarized beam, passing through the optically active substance, could be modulated instead of modulating the second linearly polarized beam, without changing the basic principles of the invention.

It should also be understood by those skilled in the art that the signal-to-noise ratio (SNR) and sensitivity of the heterodyne polarimeter of the current invention can be considerably improved by substantially attenuating (with the aid, for example, of a neutral density attenuator) the intensity of the frequency-shifted second linearly polarized light beam with respect to the intensity of the linearly polarized reference and measurement beams. This relative attenuation, which can typically be by a factor of $10$-$10^4$, reduces the basal amount of light incident on the detector and serves to reduce the shot noise and increase the relative contribution of the heterodyne signal.

The variable phase retarder can, in principle, be replaced by a simple setup comprising a second non-polarizing beam splitter, a couple of optical shutters placed immediately after the second beam splitter, a second a quarter λ wave-plate placed after the second beam splitter and a third mirror placed orthogonally to the original second mirror. The second non-polarizing beam splitter splits the third linearly polarized beam into two identical beams. One of these beams passes through the quarter λ wave-plate whose fast axis is set parallel to the main plain of the polarimeter, and becomes the measurement beam. It is then reflected in the reverse direction by the second mirror and passes again through the quarter λ wave-plate. The other beam is simply reflected back by the third mirror, in exactly the reverse direction and becomes the reference beam. The two optical shutters, placed immediately after the second beam splitter, intermittently allow only one beam to reach the detector and interfere with the frequency-shifted second beam.

This alternative setup comes at the cost of losing some laser power at the second non-polarizing beam splitter and introducing some differences between the reference and measurement beams, which might introduce additional sources of polarization noise. However, it enables the use of simpler optical elements instead of the more complex variable phase retarder.

The heterodyne polarimeter of the current invention can be realized by using independent optical components, such as cube beam splitters, calcite polarizers and coated glass lenses. Alternatively, it can be built by using integrated optical components based on an optical waveguiding platform, such as planar waveguides and optical fibers. The latter option opens the way for miniaturization of the polarimeter.

The heterodyne polarimeter in accordance with the present invention has several advantages: 1) the reference and measurement beams share a common path, making the polarimeter less susceptible to vibrations; 2) because only one laser source is used, laser phase noise and power fluctuations can be canceled; 3) the effect of low-frequency phase noise, generated by thermal effects, can be reduced by using the heterodyne signal of the reference beam; 4) any heterodyne signal at the expected frequency, which is generated by the reference beam, must result from background noise and can be subtracted from the heterodyne signal generated by the measurement beam, allowing for efficient filtering of the optical activity signal; 5) the measurement cell containing the optically active substance is traversed twice by the measurement beam enabling the doubling of the optical rotation signal; 6) the optical setup is simple and no bulky, power-consuming components like Faraday rotators are required. Moreover, once the ratio between the reference and measurement heterodyne signals at zero optical activity in the measurement cell is established and remains constant, there is no further need to measure reference (blank) samples.

DESCRIPTION OF THE PREFERRED EMBODIMENTS

The invention will now be illustrated by detailed description of the following non-limiting embodiments of the polarimeter of the invention, with reference to the figures. In the following detailed description of the embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

Figure 1:
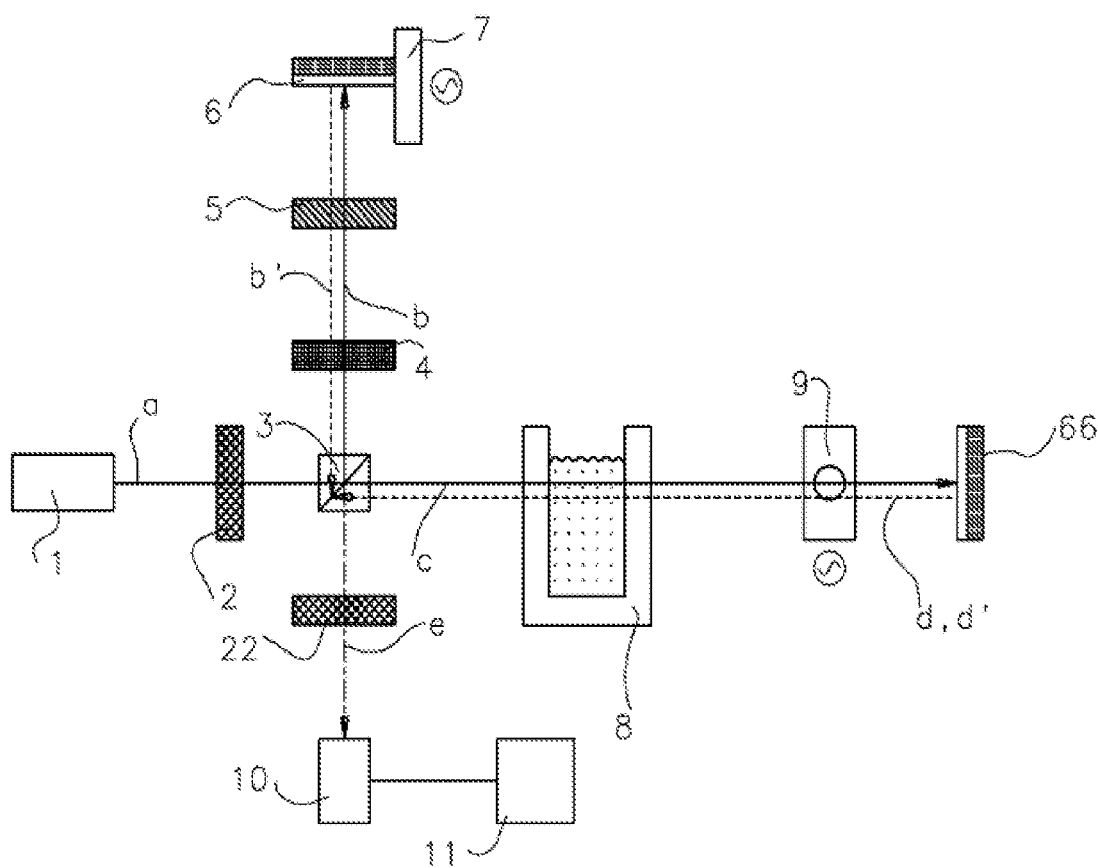
FIG. 1 is a block diagram of a polarimeter according to the first embodiment of the invention, where light paths a, b, b', c, d, d' and e of the interferometer are formed, and b and b' and c, d and d' share a common path (they are shown displaced only for the sake of clarity). In the figure: 1. laser source; 2. polarizer (whose transmission axis defines the polarimeter's main plane); 3. 50:50 non-polarizing beam splitter/combiner; 4. neutral density intensity attenuator; 5. quarter λ wave-plate (with its fast axis set at 45 degrees with respect to the polarimeter's main plane); 6. mirror mounted on a PZT-actuated translation stage; 7. PZT-actuated translation stage; 8. measurement cell containing a solution of an optically active substance; 9. variable phase retarder (with its fast axis parallel to the polarimeter's main plane); 10. detector; 11. signal processing electronics; 22. polarizer (whose transmission axis is perpendicular to polarimeter's main plane); 66. mirror.

FIG. 1 shows a scheme of a device for the quantitative determination of optically active substances in a solution, conforming to a first exemplary embodiment. The device includes a laser source that emits coherent light. The wavelength of the emitted light can typically range from 400 nanometers to 900 nanometers.

The laser source 1 generates a first coherent light beam (a). The first light beam (a) passes through a first polarizer 2 and becomes linearly polarized. The first linearly polarized beam (a) passes through a 50:50 non-polarizing beam splitter/combiner 3 and is split into a reflected second linearly polarized beam (b) and transmitted third linearly polarized beam (c). The reflected beam passes first through an attenuator 4 and its intensity is reduced—typically to 0.1-10% of its original intensity—in order to increase the SNR and sensitivity of the polarimeter. It then passes through a quarter λ wave-plate 5, with a fast axis set at 45 degrees with respect to the polarimeter's main plane, and becomes temporarily circularly polarized. The circularly polarized attenuated beam (b) is reflected in the reverse direction by a mirror 6, mounted on a piezo-actuated translation stage 7 having a long traveling range.

The piezo-actuated translation stage 7 is driven by a low frequency ramp or triangle waveform, moving the mirror several hundred micrometers in each cycle and shifting the optical frequency of the attenuated and circularly polarized (b) by the "Doppler effect". This frequency shift is typically in the range of several hundred hertz to several kilohertz. The frequency-shifted and reflected circularly polarized beam (b') again passes through the quarter λ wave-plate 5 and returns to be linearly polarized, with its electric field vector now perpendicular to its original direction.

The transmitted third linearly polarized beam (c) traverses the measurement cell 8, holding a solution of an optically active substance whose concentration is to be determined, and its electric field vector is rotated by a certain amount by the optically active substance. When this linearly polarized beam (c) exits the measurement cell 8, it passes through a variable phase retarder 9 whose fast axis is set parallel to the main plane of the polarimeter. The variable phase retarder 9 changes the relative phase of the two orthogonal components of the third linearly polarized beam (c). The relative retardance angle induced by the variable phase retarder 9 can be continuously changed, either from 0 to $\pi/2$ radians or from $\pi/2$ to $\pi$ radians, following, for example, a sine waveform at a low frequency of several hertz. When the relative retardance angle is either 0 or $\pi$ radians, the third linearly polarized light beam (c) becomes a linearly polarized reference beam (d), and when the relative retardance angle is $\pi/2$ radians, the third linearly polarized light beam (c) becomes a linearly polarized measurement beam (d'). The transition between the reference and measurement beams can be continuous, following, for example, a sine waveform at a low frequency of several hertz.

The linearly polarized reference beam (d) is reflected exactly in the reverse direction by a mirror 66, and passes again through the measurement cell 8. When the linearly polarized reference beam (d) traverses the measurement cell 8 in the reverse direction, its electric field vector is rotated by the optically active substance in the solution. However, this time the optical rotation cancels entirely the optical rotation accumulated during the passage of the third linearly polarized beam (c) in the forward direction and, therefore, the linearly polarized reference beam (d) acquires no net optical rotation.

The linearly polarized measurement beam (d') acquires a retardance angle of $\pi/2$ after passing through the variable phase retarder 9 and is reflected in the reverse direction by a mirror 66. When it passes again through the variable phase retarder 9, its electric field vector becomes mirrored about the fast axis of the variable phase retarder 9. This mirroring will allow the linearly polarized measurement beam (d') to accumulate the optical rotation when it again passes through the measurement cell 8 holding the solution of the optically active substance.

The linearly polarized measurement beam (d') returns through the measurement cell and its electric field vector again is rotated by the optically active substance, so that its total optical rotation angle is doubled.

When both the linearly polarized reference (d) and measurement (d') beams reach, in their turn, the non-polarizing beam splitter/combiner 3 on their way back, they are combined and interfere with the attenuated and frequency-shifted second linearly polarized beam (b') to generate a fourth linearly polarized beam (e). The combined fourth linearly polarized beam (e) passes through a second polarizer 22 whose transmission axis is orthogonal to that of the first polarizer 2, and its transmitted component reaches a detector 10.

The transmitted component of the combined fourth beam (e), reaching the detector 10, generates a coherently detected signal of the heterodyne type, with a frequency which is determined by the velocity of the moving mirror 6.

When the combined fourth light beam (e) is the result of interfering the reference beam (d) with the attenuated and frequency-shifted second beam (b'), the heterodyne signal becomes a reference signal whose amplitude is proportional only to the amount of polarization noise in the polarimeter. When the combined fourth light beam (e) is the result of interfering the measurement beam (d') with the attenuated and frequency-shifted beam (b'), the heterodyne signal becomes a measurement signal whose amplitude is proportional also to the optical rotation imparted by the optically active substance in the measurement cell 8. The transition between the reference and measurement signals can be continuous, following, for example, a sine waveform whose minima are the reference signal and maxima are the measurement signal.

The dependence of the total measurement photocurrent ($I_m$), generated at the detector 10, on the laser radiation and optical rotation angle-dependent and background heterodyne signals, is given by equation (1):

$$I_m \propto \sin 2\theta \cdot EE_m \cos(\Delta\omega t) + aEE_m \cos(\Delta\omega t) + DC \quad (1)$$

where $\theta$ is the measured optical rotation; E and $E_m$ are the electric fields of the linearly polarized second beam (b') and measurement beam (d'), respectively; $\Delta\omega = \omega - \omega_n$, is the angular frequency of the heterodyne signal, a is the amplitude of the background heterodyne signal, representing the total amount of polarization noise along the optical path, and DC is the direct current component.

When the optical rotation angle $\theta$ is very small, equation (1) can be simplified:

$$I_m \propto 2\theta \cdot EE_m \cos(\Delta\omega t) + aEE_m \cos(\Delta\omega t) + DC \quad (2)$$

The reference photocurrent ($I_r$) generated at the detector 10 is proportional only to the laser radiation and the amount of polarization noise along the optical path:

$$I_r \propto aEE_r \cos(\Delta\omega t) + DC \quad (3)$$

Where E and $E_r$ are the electric fields of the linearly polarized second beam (b') and reference beam (d), respectively; Since $E_r = E_m$, The reference photocurrent ($I_r$) can be used to subtract the contribution of the various sources of polarization noise from the optical activity signal.

The reference and measurement signals from the detector are stored and compared by an electronic circuit 11, which produces a comparison signal indicating the amount of optical rotation imparted by the optically active substance in the solution, and, therefore, its concentration. This comparison signal is given by equation (4):

$$I_m - I_r \propto 2\theta \cdot E_r E_m \cos(\Delta\omega t) \quad (4)$$

As is evident from equation (4), this polarimeter is capable of distinguishing between the polarization angle-dependent heterodyne signal and the background heterodyne signal generated by various sources, which is always present. This feature can become very important when a reference (blank) sample cannot be measured in order to enable background subtraction, or when a separate measurement cannot account for some sources of polarization noise.

Figure 2A:
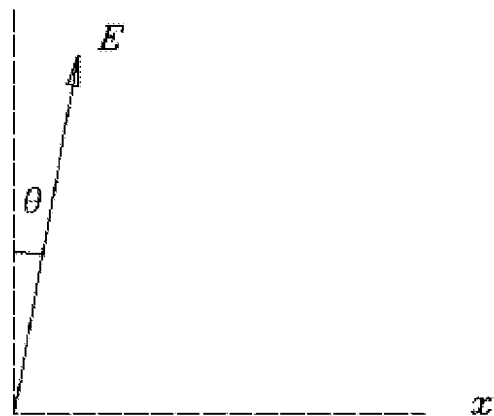
FIG. 2*a* is a vector diagram showing the direction of the electric field vectors of the third linearly polarized beam (E) in the embodiments of the invention, after it passed the measurement cell. The angle θ indicates the optical rotation imparted by the optically active substance in the measurement cell.
Figure 2B:
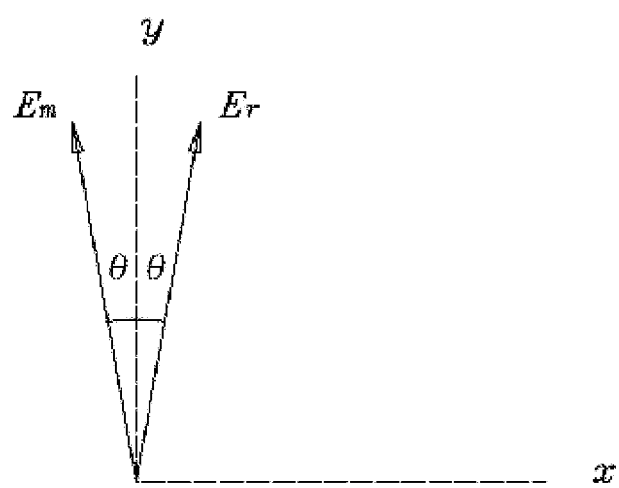
FIGS. 2*b* and 2*c* are vector diagrams showing the direction of the electric field vectors of the linearly polarized reference ($E_r$) and measurement ($E_m$) beams in the embodiments of the invention, after their second pass through the variable phase retarder (2*b*) and after their second pass through the solution of the optically active substance (2*c*).
Figure 2C:
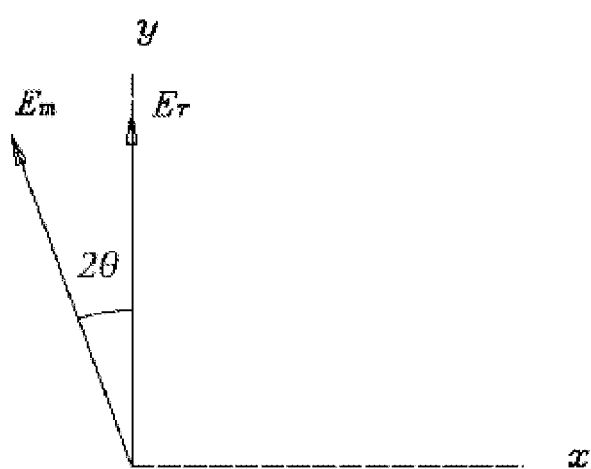

FIG. 2a, shows the direction of the electric field vector of the linearly polarized third beam (E), in the embodiments of the invention, after it passed through the optically active substance in the measurement cell. The angle θ indicates the optical activity-dependent rotation angle. FIGS. 2b and 2c show the direction of the electric field vectors of the linearly polarized reference ($E_r$) and measurement ($E_m$) beams in the embodiments of the invention just before (2b) and after (2c) the return (second) pass through the optically active substance.

When there is no optically active substance in the measurement cell, and no polarization noise, the electric field vectors of the linearly polarized measurement and reference beams maintain their original direction, which is perfectly orthogonal to the direction of the electric field vector of the attenuated and frequency-shifted second linearly polarized beam, and no heterodyne signal can be generated and detected. On the other hand, an optically active substance in the measurement cell will first rotate the electric field vector of the third linearly polarized beam (shown in FIG. 2a). Consequently, after passing back and forth via the variable phase retarder 9, the electric field vectors of the resulting reference and measurement beams will be rotated by a certain angle θ, but in opposite directions, as shown in FIG. 2b. On their way back through the measurement cell, the electric field vectors, of both the reference and measurement beams, are again rotated by the optically active substance, but this time, as shown in FIG. 2c, the electric field vector of the reference beam ($E_r$) will return to its original position, while the optical rotation of the electric field vector of the measurement beam ($E_m$) will be doubled. When the measurement beam interferes, with the attenuated and frequency-shifted second beam, in the presence of an optically active substance, an optical activity-dependent heterodyne signal will be generated at the detector. No such optical activity-dependent heterodyne signal should be detected when the reference beam interferes with the frequency-shifted second beam, since, as also shown in FIG. 2c, the electric field vector of the reference beam ($E_r$) has no component in the direction of the horizontal (x) axis.

Figure 3:
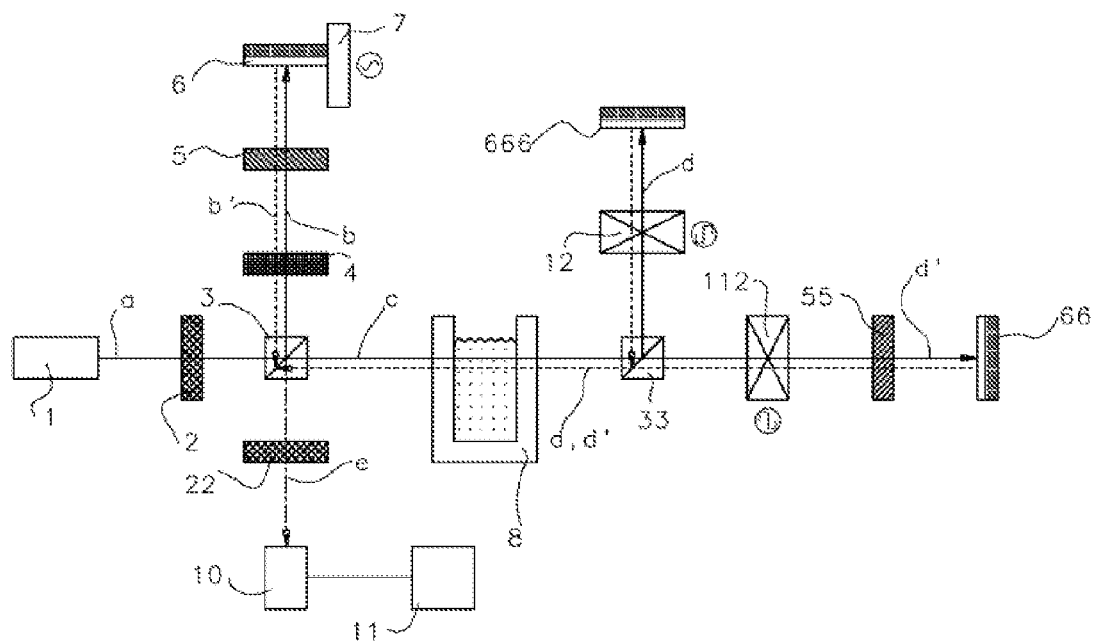
FIG. 3 is a block diagram of a polarimeter according to a second embodiment of the invention, where light paths a, b, b', c, d, d' and e of the interferometer are formed, and b and b', and c, d and d', share a common path (they are only shown displaced for the sake of clarity). In the figure: 1. laser source; 2. polarizer; (whose transmission axis defines the polarimeter's main plane); 3. 50:50 non-polarizing beam splitter/combiner; 4. neutral density intensity attenuator; 5. quarter λ wave-plate (with its fast axis set at 45 degrees with respect to the polarimeter's main plane); 6. mirror mounted on a PZT-actuated translation stage; 7. PZT-actuated translation stage; 8. measurement cell containing a solution of an optically active substance; 10. detector; 11. signal processing electronics; 12. optical shutter; 22. polarizer (whose transmission axis is perpendicular to polarimeter's main plane); 33. 50:50 non-polarizing beam splitter; 55. quarter λ wave-plate (with its fast axis parallel to the polarimeter's main plane); 66. mirror; 112. optical shutter; 666. mirror.

FIG. 3 shows a scheme of a device for the quantitative determination of optically active substances in a solution, conforming to a second exemplary embodiment. The device includes a laser source that emits coherent light. The wavelength of the emitted light can typically range from 400 nanometers to 900 nanometers.

The laser source 1 generates a first coherent light beam (a). The first light beam (a) passes through a first polarizer 2 and becomes linearly polarized. The first linearly polarized beam (a) passes through a 50:50 non-polarizing beam splitter/combiner 3 and is split into a reflected second linearly polarized beam (b) and transmitted third linearly polarized beam (c). The reflected beam passes first through an attenuator 4 and its intensity is reduced—typically to 0.1-10% of its original intensity—in order to increase the SNR and sensitivity of the polarimeter. It then passes through a quarter λ wave-plate 5, with a fast axis set at 45 degrees with respect to the polarimeter's main plane, and becomes temporarily circularly polarized. The attenuated and circularly polarized beam (b) is reflected in the reverse direction by a mirror 6, mounted on a piezo-actuated translation stage 7 having a long traveling range.

The piezo-actuated translation stage 7 is driven by a low frequency ramp or triangle waveform, moving the mirror several hundred micrometers in each cycle, and shifting the optical frequency of the circularly polarized attenuated beam (b) by the "Doppler effect". This frequency shift is typically in the range of several hundred hertz to several kilohertz. The frequency-shifted and reflected circularly polarized beam (b') again passes through the quarter λ wave-plate 5 and returns to be linearly polarized, with its electric field vector now perpendicular to its original direction.

The transmitted third linearly polarized beam (c) traverses the measurement cell 8, holding a solution of an optically active substance, whose concentration is to be determined, and its electric field vector is rotated by a certain amount by the optically active substance. When this linearly polarized beam (c) exits the measurement cell, it is split, by a 50:50 non-polarizing beam splitter 33 into a reference (d) and measurement (d') linearly polarized beams.

The linearly polarized reference beam (d) passes through an optical shutter 12 and reaches a mirror 666 placed outside the main optical axis of the interferometer and perpendicular to it. It is then reflected exactly in the reverse direction and passes again through the measurement cell 8.

The following steps in this second embodiment are exactly the same as in the first embodiment above.

When the linearly polarized reference beam (d) traverses the measurement cell 8 in the reverse direction, its electric field vector is rotated by the optically active substance in the solution. However, this time the optical rotation cancels entirely the optical rotation accumulated during the passage of the third linearly polarized beam (c) in the forward direction and, therefore, the linearly polarized reference beam acquires no net optical rotation.

The linearly polarized measurement beam (d'), which is transmitted by the non-polarizing beam splitter 33 in the original direction, passes first through an optical shutter 112 and then through a quarter λ wave-plate 55, with a fast axis set parallel to the polarimeter's main plane, and is then reflected in the reverse direction by a mirror 66.

The reflected measurement beam (d') passes again through the quarter λ wave-plate 55 and its electric field vector becomes mirrored about the fast axis of the quarter λ wave-plate 55. This mirroring will allow the linearly polarized measurement beam (d') to accumulate the optical rotation when it passes again through the measurement cell 8 holding the solution of the optically active substance. The linearly polarized measurement beam (d') returns through the measurement cell and its electric field vector again is rotated by the optically active substance, so that its total optical rotation angle is doubled.

The optical shutters 12 and 112 are operated by a square waveform and a low frequency of several hertz (or less), allowing only one beam at a time to reach the non-polarizing beam splitter/combiner 3. When the linearly polarized reference (d) and measurement (d') beams reach, in their turn, the non-polarizing beam splitter/combiner 3 on their way back, they are combined and interfere with the attenuated and frequency-shifted second linearly polarized beam (b') to generate a fourth linearly polarized beam (e). The combined fourth linearly polarized beam (e) passes through a second polarizer 22 whose transmission axis is orthogonal to that of the first polarizer 2, and its transmitted component reaches a detector 10.

The transmitted component of the combined beam (e), reaching the detector 10, generates a coherently detected signal of the heterodyne type, with a frequency which is determined by the velocity of the moving mirror 6.

When the combined fourth light beam (e) is the result of interfering the reference beam (d) with the second frequency-shifted beam (b'), the heterodyne signal is the reference signal, whose amplitude is proportional only to the amount of polarization noise in the polarimeter. When the combined fourth light beam (e) is the result of interfering the measurement beam (d') with the second frequency-shifted beam (b'), the heterodyne signal is the measurement signal whose amplitude is proportional also to the optical rotation imparted by the optically active substance in the measurement cell 8.

The reference and measurement signals from the detector 10 are stored and compared by an electronic circuit 11, which produces a comparison signal indicating the amount of optical rotation imparted by the optically active substance in the solution, and, therefore, its concentration.

The invention claimed is:

1. A method for measuring the optical rotation of a polarized light beam by an optically active substance using a polarimeter with an efficient background subtraction system, comprising the steps of:
   a) generating by a laser a first coherent light beam of a first frequency;
   b) linearly polarizing said first light beam by passing it through a first polarizer, so that its electric field vector becomes parallel to the main plane of the polarimeter, defined by the polarizer's transmission axis and the beam's direction;
   c) directing said first linearly polarized light beam through an interferometer, whereby:
      (i) said first linearly polarized light beam of (a) is split, so that one part of it is reflected at an angle with respect to the original direction, creating a second linearly polarized beam, and the other part is transmitted in the original direction, creating a third linearly polarized beam;
      (ii) the electric field vector of said reflected second linearly polarized beam is rotated by mirroring it around an axis set at 45 degrees with respect to the polarimeter's main plane, so that its polarization becomes orthogonal to the polarization of said first linearly polarized beam;
      (iii) the optical frequency of said second beam is shifted by an amount ranging, typically, from several hundred hertz to several kilohertz, so that said reflected beam now has a second frequency different from said first frequency;
      (iv) said second beam is reflected so that it returns exactly along its original path;
      (v) said transmitted third linearly polarized light beam is passed through a sample comprising an optically active substance and its electric field vector is rotated by said optically active substance;
      (vi) the relative phase of the orthogonal components of said third linearly polarized light beam is changed, either from 0 to $\pi/2$ radians or from $\pi/2$ to $\pi$ radians, said change can be continuous following, for example, a sine waveform at a low frequency of several hertz; when the relative retardance angle is either 0 or $\pi$ radians, said third linearly polarized light beam becomes a references beam, and when the relative retardance angle is $\pi/2$ radians, said third linearly polarized light beam becomes a measurement beam, the transition between said reference and measurement beams can be continuous, following, for example, a sine waveform at a low frequency of several hertz;
      (vii) said reference beam is reflected, so that it returns along the path of said third light beam and the relative phase of its orthogonal components is, again, changed by the same angle of either 0 or $\pi$ radians, so that when it passes through the sample in the reverse direction, its electric field vector is rotated by said optically active substance in the sample, in such a way that said linearly polarized reference beam accumulates no net optical rotation with respect to said first linearly polarized light beam;
      (viii) said measurement beam is also reflected and returns along the path of said third light beam and the relative phase of its orthogonal components is, again, changed by the same angle of $\pi/2$ radians, so that when it passes through the sample, its electric field vector is rotated by said optically active substance in the sample, and its optical rotation, imparted by said optically active substance, is doubled with respect to said third linearly polarized light beam;
      (ix) said linearly polarized reference and measurement light beams, transmitted by said sample, are combined and interfere, in their turn, with said second, frequency-shifted, linearly polarized light beam to generate a fourth light beam;
   d) passing said fourth linearly polarized light beam through a second polarizer, whose transmission axis is perpendicular to the transmission axis of said first polarizer;
   e) directing the transmitted component of said fourth light beam to a photodetector to generate a heterodyne signal; when said fourth light beam is the result of interfering said reference beam with said second beam, said heterodyne signal is a reference signal proportional only to the amount of polarization noise in the polarimeter; when said fourth light beam is the result of interfering said measurement beam with said second beam, said heterodyne signal is a measurement signal proportional also to the optical rotation imparted by said optically active substance, the transition between said reference and measurement signals can be continuous following, for example, a sine waveform whose minima are said reference signal and maxima are said measurement signal; and
   f) storing and processing said reference and measurement signals and generating comparison signals using said reference signals to subtract any background signals from said measurement signals, said comparison signals indicating the polarization rotation angle imparted to said linearly polarized measurement light beam by said optically active substance, said polarization rotation angle can be used to infer the concentration of said optically active substance.

2. The method of claim 1, wherein the intensity of said reflected second linearly polarized beam is attenuated, so that it becomes substantially smaller than the intensity of said transmitted third linearly polarized beam.

3. The method of claim 1, wherein said optically active substance of (v) is in a solution held in a measurement cell and said measurement cell has transparent walls.

4. The method of claim 1, wherein said comparison signals of (f) are used to quantitatively measure the concentration of said optically active substance in said solution.

5. The method of claim 1, wherein in (iii) the optical frequency of said linearly polarized second beam, with rotated electric field vector, is not shifted, but its phase is periodically modulated by a sine waveform at a frequency which is preferably several kilohertz, and amplitude which is preferably smaller than $\pi/2$ radians.

6. A polarimeter, with an efficient system for background subtraction for measuring the optical rotation of a linearly polarized light beam by an optically active substance, comprising:
   a) a laser source for generating a first coherent light beam of a first frequency;
   b) a first polarizer for linearly polarizing said first light beam whose transmission axis, together with the beam's direction, defines the main plane of the polarimeter;
   c) an interferometer comprising:
      (i) a non-polarizing beam splitter for splitting said first linearly polarized light beam, so that one part of it is reflected at an angle with respect to the original direction creating a second linearly polarized beam, and the other part is transmitted in the original direction creating a third linearly polarized beam;
      (ii) a quarter λ wave-plate placed on the path of said reflected second linearly polarized beam, whose fast axis is set at 45 degrees with respect to the polarimeter's main plane, for rotating the electric field vector of said second linearly polarized beam, so that it becomes orthogonal to its original direction after it passes said quarter λ wave-plate in the reverse direction;
      (iii) a frequency shifter, for shifting the optical frequency of said second beam, with said rotated electric field vector, so that said second linearly polarized beam will have a second frequency different from said first frequency;
      (iv) a first mirror for reflecting said second linearly polarized beam exactly in the reverse direction, whereby said reflected second beam returns along its original path;
      (v) means for holding a sample comprising an optically active substance on the path of said third linearly polarized light beam;
      (vi) a variable phase retarder placed after said means for holding a sample, which can change the relative phase of the two orthogonal components of a polarized light beam whose fast axis is set parallel to the main plane of the polarimeter; the relative retardance angle induced by said variable phase retarder can be continuously changed, either from 0 to $\pi/2$ radians or from $\pi/2$ to $\pi$ radians, following, for example, a sine waveform at a low frequency of several hertz; when the relative retardance angle is either 0 or $\pi$, said third linearly polarized light beam becomes a references beam, and when the relative retardance angle is $\pi/2$, said third linearly polarized light beam becomes a measurement beam, the transition between said reference and measurement beams can be continuous, following, for example, a sine waveform at a low frequency of several hertz;
      (vii) a second mirror, placed after said variable phase retarder, for reflecting said linearly polarized reference and measurement beams exactly in the reverse direction, whereby said reflected reference and measurement beams return through said variable phase retarder and said means for holding an optically active substance, and their electric field vector is rotated by said optically active substance, so that said linearly polarized reference beam accumulates no net optical rotation, with respect to said first linearly polarized light beam, and the optical rotation of said measurement beam, imparted by said optically active substance, is doubled with respect to said third linearly polarized light beam;
      (viii) a beam combiner for combining and interfering said returning linearly polarized reference and measurement beams, in their turn, with said second, frequency-shifted, light beam to generate a fourth light beam;
   d) a second polarizer whose transmission axis is orthogonal to the transmission axis of said first polarizer;
   e) a photodetector for receiving the transmitted component of said fourth linearly polarized light beam and generating a heterodyne signal; when said fourth light beam is the result of interfering said reference beam with said second beam, said heterodyne signal is a reference signal proportional only to the amount of polarization noise in the polarimeter; when said fourth light beam is the result of interfering said measurement beam with said second beam, said heterodyne signal is a measurement signal proportional also to the optical rotation imparted by said optically active substance, the transition between said reference and measurement signals can be continuous following, for example, a sine waveform whose minima are said reference signal and maxima are said measurement signal; and
   f) electronic means for storing and processing said reference and measurement signals and for generating comparison signals using said reference signals to subtract any background signals from said measurement signals, said comparison signals indicating the polarization rotation angle imparted to said linearly polarized measurement beam, said polarization rotation angle can be used to infer the concentration of said optically active substance.

7. The polarimeter of claim 6, wherein an attenuator is placed on the path of said second linearly polarized beam so that its intensity becomes substantially lower than the intensity of said third linearly polarized beam.

8. The polarimeter of claim 6, wherein said means of (c, v) for holding said sample comprising the optically active substance is a measurement cell with transparent walls and said optically active substance is in a solution.

9. The polarimeter of claim 6, wherein said comparison signals of (f) are used for quantitatively measuring the concentration of said optically active substance in said solution.

10. The polarimeter of claim 6, wherein said variable phase retarder is a liquid crystal phase retarder or an electro-optic phase retarder.

11. The polarimeter of claim 6, wherein said frequency shifter is said mirror of (c, iv) mounted on a translation stage, actuated by a piezoelectric crystal driven by a ramp or triangle waveforms.

12. The polarimeter of claim 6, wherein said frequency shifter is an electro-optic modulator or an acousto-optic modulator.

13. The polarimeter of claim 6, wherein said frequency shifter is replaced by a phase modulator for periodically modulating the phase of said linearly polarized second beam at a frequency of several kilohertz, with a sine waveform and amplitude, which is preferably less than $\pi/2$ radians, so that the phase of said linearly polarized second beam will periodically change with respect to the phase of said linearly polarized reference and measurement beams.

14. The polarimeter of claim 13, wherein said phase modulator is said mirror mounted on a PZT-actuated translation stage.

15. The polarimeter of claim 13, wherein said phase modulator is a thin PZT disk coated by a reflecting layer.

16. The polarimeter of claim 6, wherein said variable phase retarder is replaced by a setup comprising a second non-polarizing beam splitter, two optical shutters, (placed immediately after said second beam splitter on the path of its output beams), a second a quarter) wave-plate (placed after one of said shutters, with its fast axis parallel to the polarimeter's main plane) and a third mirror (placed after the second of said shutters, orthogonally to said second mirror); said optical shutters are intermittently activated, at a low frequency of several hertz, to allow only one of said reference and measurement beams at a time to reach the detector and interfere with said frequency-shifted second beam.

17. The polarimeter of claim 6, wherein said laser light source, polarizers, beam splitters, frequency shifter or phase modulator, beam combiner, quarter $\lambda$ wave-plate, mirrors, shutters and photodetectors are independent components, such as cube beam splitters, calcite polarizers and coated glass lenses.

18. The polarimeter of claim 6, wherein some or all of said light source, polarizers, beam splitters, frequency shifter or phase modulator, beam combiner, quarter $\lambda$ wave-plate, mirrors, shutters and photodetectors are integrated optical components, based on an optical waveguiding platform.

19. The method of claim 3, wherein said comparison signals of (f) are used to quantitatively measure the concentration of said optically active substance in said solution.

20. The polarimeter of claim 16, wherein said laser light source, polarizers, beam splitters, frequency shifter or phase modulator, beam combiner, quarter $\lambda$ wave-plate, mirrors, shutters and photodetectors are independent components, such as cube beam splitters, calcite polarizers and coated glass lenses.

21. The polarimeter of claim 16, wherein some or all of said light source, polarizers, beam splitters, frequency shifter or phase modulator, beam combiner, quarter $\lambda$ wave-plate, mirrors, shutters and photodetectors are integrated optical components, based on an optical waveguiding platform.

\* \* \* \* \*